(12) United States Patent
Notoya

(10) Patent No.: US 7,674,330 B2
(45) Date of Patent: Mar. 9, 2010

(54) INK AND INK-JET RECORDING APPARATUS

(75) Inventor: Yasuharu Notoya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 11/954,465

(22) Filed: Dec. 12, 2007

(65) Prior Publication Data

US 2008/0282930 A1 Nov. 20, 2008

(30) Foreign Application Priority Data

Dec. 18, 2006 (JP) .............................. 2006-339577

(51) Int. Cl.
*C09D 13/00* (2006.01)
*C09D 11/00* (2006.01)
*B05D 5/00* (2006.01)
*B41J 2/175* (2006.01)
*B41J 2/17* (2006.01)
*G01D 11/00* (2006.01)

(52) U.S. Cl. .................. 106/31.6; 427/256; 347/85; 347/86; 347/96; 347/100; 106/31.13; 106/31.97

(58) Field of Classification Search .................. None
See application file for complete search history.

(56) References Cited

U.S. PATENT DOCUMENTS

| 4,313,124 A | 1/1982 | Hara .................. 346/140 R |
| 4,345,262 A | 8/1982 | Shirato et al. ........... 346/140 R |
| 4,459,600 A | 7/1984 | Sato et al. ............. 346/140 R |
| 4,463,359 A | 7/1984 | Ayata et al. .................. 346/1.1 |
| 4,558,333 A | 12/1985 | Sugitani et al. ......... 346/140 R |
| 4,723,129 A | 2/1988 | Endo et al. .................. 346/1.1 |
| 4,740,796 A | 4/1988 | Endo et al. .................. 346/1.1 |
| 5,160,370 A | 11/1992 | Suga et al. ..................... 106/20 |
| 5,229,786 A | 7/1993 | Suga et al. .................. 346/1.1 |
| 5,734,403 A | 3/1998 | Suga et al. .................. 347/101 |
| 2002/0067402 A1* | 6/2002 | Nishita ..................... 347/102 |

FOREIGN PATENT DOCUMENTS

| JP | 54-51837 | 4/1979 |
| JP | 59-123670 | 7/1984 |
| JP | 2-255875 | 10/1990 |
| JP | 4-57859 | 2/1992 |
| JP | 4-57860 | 2/1992 |
| JP | 6-99656 | 4/1994 |

\* cited by examiner

*Primary Examiner*—Melvin C Mayes
*Assistant Examiner*—Sarah Van Oudenaren
(74) *Attorney, Agent, or Firm*—Fitzpatrick, Cella, Harper & Scinto

(57) ABSTRACT

An ink used in an ink-jet recording process in which ink droplets are ejected from a recording head by the action of thermal energy to record images on a recording medium; the ink containing at least (a) a pigment, (b) a dispersing agent, (c) a liquid medium and (d) an alkali metal salt of a malonic acid derivative, represented by the following Formula (1):

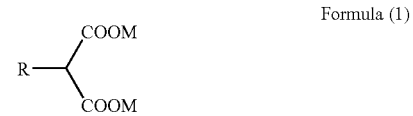

Formula (1)

wherein R represents an alkyl group, and M represents an alkali metal.

4 Claims, No Drawings

INK AND INK-JET RECORDING APPARATUS

BACKGROUND OF THE INVENTION

1. Field of the Invention

This invention relates to an ink used in an image forming process in which ink droplets are ejected from a recording head by the action of thermal energy to record images on a recording medium, and to an ink-jet recording apparatus making use of such an ink. More particularly, it relates to an ink-jet recording pigment ink having been improved dramatically in ejection stability required when a pigment ink achievable of a high fastness property of images is ejected from the recording head of the above system, and to an ink-jet recording apparatus making use of such an ink.

2. Description of the Related Art

Various systems have conventionally been proposed in the printing that employs an ink-jet recording process. For example, Japanese Patent Application Laid-open No. S54-051837 discloses an ink-jet recording process in which ink is ejected in the form of ink droplets by the action of thermal energy [what is called a BUBBLE JET (registered trademark of CANON INC.) process]. In particular, this recording process facilitates a high-density multi-nozzle very much, and hence has characteristic features that high-quality images are obtainable at a high speed and at a very low cost, and that images are printable also on plain paper, which has any special coating layer. To describe this recording process in detail, first, a heater of the recording head is rapidly heated, whereupon a liquid on a heater comes into air bubbles to cause an abrupt increase in volume. Next, in virtue of impact pressure standing on this abrupt increase in volume, ink droplets are ejected from nozzles at the tip of the recording head and fly therefrom to the recording medium to adhere thereto, thus printing is performed.

Here, in the ink-jet recording process as described above, it is usual to use aqueous dye inks making use of dyes as coloring materials. Recently, however, it is attempted to use aqueous pigment inks making use of pigments as coloring materials. What is given as a reason therefor is that images recorded using the aqueous pigment inks can be superior in fastness property such as water resistance or light-fastness property, compared with images recorded using the aqueous dye inks. On this matter, aqueous pigment inks satisfying basic properties such as image recording quality level, ink ejection performance, storage stability, anti-clogging and fixability which are required in ink-jet recording inks are proposed as disclosed in, e.g., Japanese Patent Applications Laid-open No. H02-255875, No. H04-334870, No. H04-057859 and No. H04-057860.

As stated previously, the BUBBLE JET (registered trademark) process is greatly characterized in its possibility for higher nozzle density, and is an image forming process which is of a superior system among any ink-jet recording processes. However, when an aqueous pigment ink is ejected by such a process as the BUBBLE JET (registered trademark) process, it comes about that the ink is exposed to high temperature at the heater surface of the recording head, and hence a problem as stated below may arise. In the system as above, components contained in the pigment ink may change in properties because of an effect due to the high temperature at the heater surface of the recording head to become accumulated on the heating element surface as deposits. Then, with accumulation of such deposits, it may come about that the heater of the recording head comes to have poorer heat conduction performance with time, so that the impact pressure accompanying the bubbling of ink becomes lower, resulting in deterioration of ejection performance, and furthermore resulting in a poor quality of recorded images. Hence, in order to make pigment inks favorable for the ink-jet recording system in which ink droplets are ejected from a recording head by the action of thermal energy, it is sought to provide an ink that has resolved the above problem, in addition to the above basic properties.

SUMMARY OF THE INVENTION

Accordingly, an object of the present invention is to provide a pigment ink which shows a good ejection performance also in long-time recording and can stably give high-grade images superior in fastness property such as water resistance or light-fastness property when used in the ink-jet recording of the system in which ink droplets are ejected from a recording head by the action of thermal energy.

Another of the present invention is to provide an ink-jet recording apparatus which can bring out the above superior effects.

The above objects can be achieved by the present invention described below. That is, the present invention is an ink used in an ink-jet recording process in which ink droplets are ejected from a recording head by the action of thermal energy to record images on a recording medium, and is an ink characterized by containing at least (a) a pigment, (b) a dispersing agent, (c) a liquid medium and (d) an alkali metal salt of a malonic acid derivative, represented by the following Formula (1):

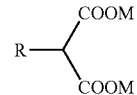

Formula (1)

wherein R represents an alkyl group, and M represents an alkali metal.

Another form of the present invention is an ink-jet recording apparatus characterized by having a means for ejecting the above ink in the form of ink droplets, from a recording head by the action of thermal energy to record an image on a recording medium.

Where images are recorded by the above system by using the ink of the present invention, the following effect can be obtained. That is, there can very effectively be less deposits on the surface of a heater set up for providing an ink with thermal energy to eject an aqueous pigment ink (hereinafter simply "ink") from ink orifices, and this enables stabilization of ejection performance.

The reason why the use of the ink of the present invention brings out such an effect of making ejection performance very stable is unclear. The present inventor presumes it as follows: According to studies made by the present inventor, the incorporation of the component (d) in the ink makes what are itemized in the following (1) to (3) occur and these have served chief factors in obtaining the above effect, as so presumed.

(1) The alkali metal in the component (d) inhibits association of the carboxyl groups which are solubilizing groups of a resin (dispersing agent) and prevents dehydration reaction of the carboxyl groups such as acid anhydride reaction that is due to heat. That is, even though the ink of the present invention is exposed to high temperature at the heater surface, the carboxyl groups which are solubilizing groups of a resin (dispersing agent) are not thermally decomposed and this has prevented the pigment from having a low dispersibility, as so presumed.

(2) The malonic acid moiety of the component (d) is weakly acidic and the alkali metal is strongly alkaline, and hence a solution (i.e., the ink) containing the component (d) has buffer action. Hence, the ink can weakly be alkaline also when the temperature changes abruptly, to maintain the solubility of the resin (dispersing agent), bringing an improvement in the dispersibility of the pigment, as so presumed.

(3) The alkyl group in the structure of the component (d) has mutual action with hydrophobic moieties of the pigment and resin (dispersing agent) and this has brought an improvement in the dispersibility of the pigment, as so presumed.

As stated above, according to the present invention, the performance of ink ejection from a recording head can be kept in a stable and good condition also in long-time recording and when ink droplets are ejected from the recording head by the action of thermal energy to record images on the recording medium. At the same time, the present invention can also provide an ink which can achieve formation of high-grade images superior in fastness property such as water resistance or light-fastness property, and an ink-jet recording apparatus making use of such an ink.

Further features of the present invention will become apparent from the following description of exemplary embodiments.

DESCRIPTION OF THE EMBODIMENTS

The present invention is described below in detail by giving preferred embodiments.

The ink of the present invention is described first. The ink contains as its constituents at least (a) a pigment, (b) a dispersing agent, (c) a liquid medium and (d) an alkali metal salt of a malonic acid derivative, represented by Formula (1) expressed later. The present inventor has made extensive studies on how to stabilize the ejection of inks making use of pigments as coloring materials in the ink-jet recording process in which ink droplets are ejected from a recording head by the action of thermal energy. As the result, the inventor has discovered that an ink containing a component (d) detailed later may be used as the ink used in the ink-jet recording process and this enables very effective stabilization of ejection performance. Thus, the inventor has accomplished the present invention. The respective constituents of the ink of the present invention are described below.

(d) Alkali Metal Salt of Malonic Acid Derivative

The component (d) that characterizes the ink of the present invention is described first. The component (d) used in the present invention is an alkali metal salt of a malonic acid derivative, as represented by the following Formula (1):

Formula (1)

wherein R represents an alkyl group, and M represents an alkali metal.

Such an alkali metal salt of a malonic acid derivative may include, e.g., lithium methyl malonate, sodium methyl malonate, potassium methyl malonate, rubidium methyl malonate, and cesium methyl malonate; lithium ethyl malonate, sodium ethyl malonate, potassium ethyl malonate, rubidium ethyl malonate, and cesium ethyl malonate; lithium propyl malonate, sodium propyl malonate, potassium propyl malonate, rubidium propyl malonate, and cesium propyl malonate; lithium butyl malonate, sodium butyl malonate, potassium butyl malonate, rubidium butyl malonate, and cesium butyl malonate; lithium pentyl malonate, sodium pentyl malonate, potassium pentyl malonate, rubidium pentyl malonate, and cesium pentyl malonate; and lithium hexyl malonate, sodium hexyl malonate, potassium hexyl malonate, rubidium hexyl malonate, and cesium hexyl malonate.

Of these, alkali metal salts of any of methyl malonic acid, ethyl malonic acid and butyl malonic acid are preferred because these are readily available. In particular, alkali metal salts of butyl malonic acid are more preferred because of their strong hydrophobic mutual action with the resin (dispersing agent) and pigment. As the alkali metal which is the counter ion, potassium is particularly preferred because it promises a high effect and is readily available.

The component (d) as enumerated above may be used alone or in the form of a mixture of two or more types. The component (d) in the ink of the present invention may preferably be in a total content ranging from 0.005% by mass to 5% by mass based on the total mass of the ink. It may more preferably be used in a total content ranging from 0.05% by mass to 1% by mass based on the total mass of the ink. Setting the content of the component (d) within this range makes the ink of the present invention bring out a superior effect of stabilizing the ejection, and also brings an ink which can not easily cause nozzle clogging of the recording head.

(a) Pigment

The pigment which is the component (a) making up the ink of the present invention is described next. As the pigment, all sorts of pigments may be used, such as inorganic pigments and organic pigments. Stated specifically, those enumerated below may be used, but are not limited to these.

Carbon black; C.I. Pigment Yellow 1, 2, 3, 12, 13, 14, 16, 17, 73, 74, 75, 83, 93, 95, 97, 98, 114, 128, 129, 151, 154 and 195;C.I. Pigment Red 5, 7, 12, 48 (Ca), 48 (Mn), 57 (Ca), 57:1, 57 (Sr), 112, 122, 123, 168, 184 and 202;C.I. Pigment Blue 1, 2, 3, 15:3, 15:34, 16, 22 and 60;and C.I. Vat Blue 4 and 6.

The pigment as enumerated above which is used as a coloring material of the ink of the present invention may be used alone, or may be used in combination of two or more types. As to the concentration of the pigment, there are no particular limitations thereon. Usually, it may appropriately be selected within the range of from 0.1% by mass to 20% by mass based on the total mass of the ink.

(b) Dispersing Agent

The dispersing agent which is the component (b) making up the ink of the present invention is described next. In the case when the pigment as enumerated above is used as the coloring material, a dispersing agent is used in order for the pigment to be stably dispersed in the ink. In the present invention, as stated above, the use of the component (d) alkali metal salt of a malonic acid derivative enables the pigment to be prevented from having a low dispersibility and to be improved in its dispersibility when ink droplets are ejected from a recording head by the action of thermal energy to perform recording. As the dispersing agent, a polymeric dispersing agent or a surface active agent type dispersing agent may be used. A higher effect is obtainable when the polymeric dispersing agent (a resin) is used. Of course, a plurality of dispersing agents may be used in combination.

As the polymeric dispersing agent, it is preferable to use a polymer or copolymer which have both hydrophobic property and hydrophilic property, as shown below, and to which an inorganic or organic alkaline compound has been added to improve the solubility of the polymer or copolymer. As the polymeric dispersing agent, usable are, e.g., polyacrylates, styrene-acrylic acid copolymer salts, styrene-methacrylic acid copolymer salts, styrene-acrylic acid-acrylate copolymer salts, styrene-maleic acid copolymer salts, acrylate-maleic acid copolymer salts, styrene-methacrylsulfonic acid copolymer salts, vinylnaphthalene-maleic acid copolymer salts, βnaphthalenesulfonic acid formalin condensation product salts, polyvinyl pyrrolidone, polyethylene glycol, and polyvinyl alcohol. Of these, it is particularly preferable to use one having a weight average molecular weight in the range of from 1,000 to 30,000 and an acid value in the range of from 100 to 430.

The surface active agent type dispersing agent may include, e.g., laurylbenzenesulfonates, laurylsulfonates, laurylbenzenecarboxylates, laurylnaphthalenesulfonates, aliphatic amine salts and polyethylene oxide condensation products. Any of these dispersing agents may be used in an amount ranging from pigment mass:dispersing agent mass=10:5 to 10:0.5.

(c) Liquid Medium

The liquid medium which is the component (c) making up the ink of the present invention is described next. As the liquid medium, one which contains water may preferably be used. In particular, a mixed medium may preferably be used which makes use of water and a water-soluble organic solvent in combination. As the water, it is desirable to use not usual water containing various ions, but deionized water. The water may preferably be in a content ranging from 35% by mass to 96% by mass based on the total mass of such an aqueous ink.

The water-soluble organic solvent is used for various purposes of, e.g., adjusting the viscosity of ink to a suitable viscosity preferable for use, and lowering the drying rate of the ink and improving the solubility of coloring material to prevent recording head nozzles from clogging. The water-soluble organic solvent may preferably be used in the ink in a total content ranging from 0.5% by mass to 20% by mass based on the total mass of the ink. It may further preferably be used in a total content ranging from 1% by mass to 15% by mass based on the total mass of the ink. Its use within the above range makes it able to obtain the ink which has a superior effect of stabilizing the ejection and also can not easily cause nozzle clogging of the recording head.

The water-soluble organic solvent to be used in the above, may, stated specifically, include, e.g., alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketoalcohols such as acetone and diacetone alcohols; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols whose alkylene groups have 2 to 6 carbon atoms, such as ethylene glycol, propylene glycol, trimethylene glycol, triethylene glycol and 1,2,6-hexanetriol; glycerol; trimethylol ethane and trimethylol propane; lower alkyl ethers such as ethylene glycol monomethyl (or ethyl) ether, diethylene glycol monomethyl (or ethyl) ether and triethylene glycol monomethyl (or ethyl) ether; lower dialkyl ethers of polyhydric alcohols, such as triethylene glycol dimethyl (or ethyl) ether and tetraethylene glycol dimethyl (or ethyl) ether; alkanolamines such as monoethanolamine, diethanolamine and triethanolamine; and sulfolane, N-methyl-2-pyrrolidone, 2-pyrrolidone, and 1,3-dimethyl-2-imidazolidinone. The water-soluble organic solvent as described above may be used alone or in the form of a mixture. Any of the water-soluble organic solvents as enumerated above may be used alone or in the form of a mixture of two or more types.

Additives

In the ink of the present invention, besides the foregoing components, conventionally known commonly available various additives may optionally be incorporated. Such additive may include, e.g., a viscosity modifier, a pH adjuster, a mildew-proofing agent, an anticeptic, an antioxidant, an anti-foaming agent, a surface-active agent, and a nozzle drying preventive agent such as urea. Any of these may be added under appropriate selection.

Physical Properties of Ink

The ink of the present invention, having composition as described above, is used in the ink-jet recording process in which ink droplets are ejected from a recording head by the action of thermal energy to record images on a recording medium. Hence, the ink of the present invention may preferably be one having, as its physical properties, values within the following ranges. That is, as its values at about 25° C., pH may preferably be from 3 to 12, and more preferably from 4 to 10;surface tension may preferably be from 10 to 60 mN/m (dyn/cm), and more preferably from 15 to 50 mN/m (dyn/cm); and viscosity may preferably be from 1 to 30 cps (mPa·s), and more preferably from 1 to 10 cps (mPa·s).

Ink-Jet Recording Apparatus

The ink-jet recording apparatus of the present invention is described next. The ink-jet recording apparatus of the present invention is characterized by having a means for ejecting the above ink of the present invention in the form of ink droplets, from a recording head by the action of thermal energy to record images on a recording medium. A preferable apparatus may include, e.g., ink-jet recording apparatus of a BUBBLE JET (registered trademark) system. In the present invention, however, without limitation thereto, it may at least be the apparatus making use of the ink of the present invention and employing the means described above. As the others, it may be one having the same make-up as conventional apparatus.

Typical construction and principles of the recording system used in the present invention are disclosed in, e.g., U.S. Pat. No. 4,723,129 and No. 4,740,796. The apparatus of the present invention may preferably one making use of these basic principles. This recording system is applicable to any of what are called an on-demand type and a continuous type. In particular, in the case of the on-demand type, this system has an advantage that ink ejection with especially good response can be achieved because the ink is ejected in the following way. In the on-demand type recording system, first, at least one drive signal corresponding to recording information and giving rapid temperature rise that exceeds nucleate boiling is applied to an electrothermal transducer disposed correspondingly to a sheet or fluid channels on or through which the ink is held, to generate thermal energy in the electrothermal transducer. Then, this thermal energy causes film boiling on the heat acting face of a recording head, and consequently bubbles in ink can be formed one to one correspondingly to this drive signal.

Then, the growth and shrinkage of the bubbles cause the ink to be ejected through ejection orifices to form at least one ink droplet. Where this drive signal is applied in a pulse form, the growth and shrinkage of the bubbles take place instantly and appropriately, and hence the ejection of ink in an especially good response can be achieved. As this drive signal of a pulse form, suited are those which are disclosed in U.S. Pat. No. 4,463,359 and No. 4,345,262. The employment of conditions disclosed in U.S. Pat. No. 4,313,124, which relates to the rate of temperature rise on the heat build-up face, enables performance of much superior recording.

As the recording head making up the ink-jet recording apparatus of the present invention, a recording head may be used which is made up by combination of an ejection orifice, a liquid channel and an electrothermal transducer as disclosed in the above respective U.S. Patents (a linear fluid channel or a right-angle fluid channel). Besides, a recording head set up as disclosed in U.S. Pat. No. 4,558,333 and No. 4,459,600, which disclose construction in which a heat build-up part is disposed in a bent region, may also effectively be used in the ink-jet recording apparatus of the present invention. In addition, a recording head which is so set up that an ejection orifice common to a plurality of electrothermal transducers is provided as an ejection part of the electrothermal transducers (Japanese Patent Application Laid-open No. S59-123670, etc.) may also effectively be used in the ink-jet recording apparatus of the present invention.

Further, as a recording head of a full-line type, having a length corresponding to the maximum width of a recording medium on which an ink-jet recording apparatus can perform recording, what is as shown below may be used. It may be so set up that its length condition is fulfilled by combination of a plurality of recording heads as disclosed in the above publications, or may be so set up as to be one recording head which is integrally formed, either of which may be used in the ink-jet recording apparatus of the present invention. In the ink-jet recording apparatus having such a recording head, the above effect of the present invention can more effectively be brought out.

An exchangeable chip type recording head which, when set in the apparatus main body, enables electrical connection with the apparatus main body or feed of ink from the apparatus main body is also preferable as construction of the recording head of the ink-jet recording apparatus of the present invention. Instead, a cartridge type recording head provided integrally in the recording head itself may also be effective as construction of the recording head of the ink-jet recording apparatus of the present invention.

In the ink-jet recording apparatus of the present invention, it is also preferable for the apparatus to have structure in which a restoration means, a preliminary auxiliary means and so forth for the recording head described above have been added. The apparatus set up in this way can make the effect of the present invention more stable. As specific means therefor, there may be given a capping means, a cleaning means and a pressure or suction means which are provided for the recording head; an electrothermal transducer or a heating means different therefrom, or a preliminary heating means set up by combination of these; and a preliminary ejection mode which performs ejection different from that for recording.

EXAMPLES

The present invention is described below in greater detail by giving Examples and Comparative Examples. The present invention is by no means limited by the following Examples as long as it is not beyond its gist. In the following, "part(s)" and "(%)" are by mass unless particularly noted.

Examples 1 to 8

Example 1

Preparation of Pigment Dispersion Solution 1

| | |
|---|---|
| Styrene-acrylic acid-butyl acrylate copolymer (acid value: 116; weight average molecular weight: 3,700) | 5 parts |
| Triethanolamine | 0.5 part |
| Diethylene glycol | 5 parts |
| Ion-exchanged water | 69.5 parts |

The above components were mixed, and the mixture obtained was heated to 70° C. with a water bath to make the resin component dissolve completely. To the solution obtained, 15 parts of carbon black "MA-100" ((pH: 3.5;available from Mitubishi Chemical Corporation) and 5 parts of 2-propanol were added, and these were premixed for 30 minutes, followed by dispersion treatment under the following conditions.

Dispersion machine: Sand grinder.
Grinding medium: Zirconium beads of 1 mm in diameter.
Packing of grinding medium: 50% by volume.
Grinding time: 3 hours.

Further, coarse particles were removed by centrifugal separation (at 12,000 rpm for 20 minutes) to obtain Pigment dispersion solution 1.

Preparation of Ink of Example 1

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 1.

| | |
|---|---|
| Pigment dispersion solution 1 | 30 parts |
| Diethylene glycol | 10 parts |
| Glycerol | 10 parts |
| Potassium butyl malonate | 1 part |
| Ion-exchanged water | 49 parts |

Example 2

Preparation of Pigment Dispersion Solution 2

| | |
|---|---|
| Styrene-acrylic acid copolymer (weight average molecular weight: about 7,000) | 3.5 parts |
| Potassium hydroxide | 1.0 part |
| Diethylene glycol | 5.0 parts |
| Ion-exchanged water | 65.5 parts |

First, the above components were put into a container and mixed, and the mixture obtained was heated to 70° C. with a water bath to make the resin component dissolve completely. Next, to the solution obtained, 24 parts of C.I. Pigment Yellow 93 and 1.0 part of isopropyl alcohol were added, and these were premixed for 30 minutes, followed by dispersion treatment carried out under the same conditions as those in preparing Pigment dispersion solution 1. Further, the dispersion thus obtained was treated by centrifugal separation (at 12,000 rpm for 20 minutes) to remove coarse particles to obtain Pigment dispersion solution 2, having a solid content of 27.5%.

Preparation of Ink of Example 2

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 2.

| | |
|---|---|
| Pigment dispersion solution 2 | 20 parts |
| Diethylene glycol | 10 parts |
| Glycerol | 10 parts |
| Potassium butyl malonate | 1 part |
| Ion-exchanged water | 59 parts |

Example 3

Preparation of Pigment Dispersion Solution 3

| | |
|---|---|
| Styrene-acrylic acid copolymer (weight average molecular weight: about 7,000) | 3.5 parts |
| Potassium hydroxide | 1.0 part |
| Diethylene glycol | 5.0 parts |
| Ion-exchanged water | 65.5 parts |

First, the above components were put into a container and mixed, and the mixture obtained was heated to 70° C. with a water bath to make the resin component dissolve completely. Next, to the solution obtained, 24 parts of C.I. Pigment Red 122 and 1.0 part of isopropyl alcohol were added, and these were premixed for 30 minutes, followed by dispersion treatment carried out under the same conditions as those in preparing Pigment dispersion solution 1. Further, the dispersion thus obtained was treated by centrifugal separation (at 12,000 rpm for 20 minutes) to remove coarse particles to obtain Pigment dispersion solution 3, having a solid content of 27.5%.

Preparation of Ink of Example 3

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 3.

| | |
|---|---|
| Pigment dispersion solution 3 | 20 parts |
| Diethylene glycol | 10 parts |
| Glycerol | 10 parts |
| Potassium butyl malonate | 1 part |
| Ion-exchanged water | 59 parts |

Example 4

Preparation of Pigment Dispersion Solution 4

| | |
|---|---|
| Preparation of Pigment dispersion solution 4 | |
| Styrene-acrylic acid copolymer (weight average molecular weight: about 7,000) | 3.5 parts |
| Potassium hydroxide | 1.0 part |
| Diethylene glycol | 5.0 parts |
| Ion-exchanged water | 65.5 parts |

First, the above components were put into a container and mixed, and the mixture obtained was heated to 70° C. with a water bath to make the resin component dissolve completely. Next, to the solution obtained, 24 parts of C.I. Pigment Blue 15:3 and 1.0 part of isopropyl alcohol were added, and these were premixed for 30 minutes, followed by dispersion treatment carried out under the same conditions as those in preparing Pigment dispersion solution 1. Further, the dispersion thus obtained was treated by centrifugal separation (at 12,000 rpm for 20 minutes) to remove coarse particles to obtain Pigment dispersion solution 4, having a solid content of 27.5%.

Preparation of Ink of Example 4

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 4.

| | |
|---|---|
| Pigment dispersion solution 4 | 20 parts |
| Diethylene glycol | 10 parts |
| Glycerol | 10 parts |
| Potassium butyl malonate | 1 part |
| Ion-exchanged water | 59 parts |

Example 5

Preparation of Ink of Example 5

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 5.

| | |
|---|---|
| Pigment dispersion solution 4 | 20 parts |
| Diethylene glycol | 10 parts |
| Glycerol | 10 parts |
| Potassium methyl malonate | 1 part |
| Ion-exchanged water | 59 parts |

Example 6

Preparation of Ink of Example 6

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 6.

| | |
|---|---|
| Pigment dispersion solution 4 | 20 parts |
| Diethylene glycol | 10 parts |
| Glycerol | 10 parts |
| Sodium butyl malonate | 1 part |
| Ion-exchanged water | 59 parts |

Example 7

Preparation of Ink of Example 7

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 7.

| Pigment dispersion solution 4 | 20 parts |
| --- | --- |
| Diethylene glycol | 10 parts |
| Glycerol | 10 parts |
| Cesium butyl malonate | 1 part |
| Ion-exchanged water | 59 parts |

Example 8

Preparation of Ink of Example 8

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 8.

| Pigment dispersion solution 4 | 20 parts |
| --- | --- |
| Diethylene glycol | 10 parts |
| Glycerol | 10 parts |
| Potassium butyl malonate | 0.5 part |
| Ion-exchanged water | 58 parts |

Comparative Examples 1 to 6

Using Pigment dispersion solutions 1 to 4 individually, which were prepared in Examples, inks of Comparative Examples were prepared.

Comparative Example 1

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 1.

| Pigment dispersion solution 1 | 30 parts |
| --- | --- |
| Diethylene glycol | 10 parts |
| Glycerol | 10 parts |
| Ion-exchanged water | 50 parts |

Comparative Example 2

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 2.

| Pigment dispersion solution 2 | 20 parts |
| --- | --- |
| Diethylene glycol | 10 parts |
| Glycerol | 10 parts |
| Ion-exchanged water | 60 parts |

Comparative Example 3

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 3.

| Pigment dispersion solution 3 | 20 parts |
| --- | --- |
| Diethylene glycol | 10 parts |
| Glycerol | 10 parts |
| Ion-exchanged water | 60 parts |

Comparative Example 4

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 4.

| Pigment dispersion solution 4 | 20 parts |
| --- | --- |
| Diethylene glycol | 10 parts |
| Glycerol | 10 parts |
| Ion-exchanged water | 60 parts |

Comparative Example 5

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 5.

| Pigment dispersion solution 4 | 20 parts |
| --- | --- |
| Diethylene glycol | 10 parts |
| Glycerol | 10 parts |
| Potassium malonate | 1 part |
| Ion-exchanged water | 59 parts |

Comparative Example 6

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 6.

| Pigment dispersion solution 4 | 20 parts |
| --- | --- |
| Diethylene glycol | 10 parts |
| Glycerol | 10 parts |
| Ammonium butyl malonate | 1 part |
| Ion-exchanged water | 59 parts |

How the inks of Examples 1 to 8 and Comparative Examples 1 to 6, prepared as above, were chiefly composed is shown together in Table 1.

TABLE 1

Chief Composition of Inks

| | Pigment | Compound (d) | Amount |
|---|---|---|---|
| Example: | | | |
| 1 | Carbon black | Potassium butyl malonate | 1 part |
| 2 | Pigment Yellow 93 | Potassium butyl malonate | 1 part |
| 3 | Pigment Red 122 | Potassium butyl malonate | 1 part |
| 4 | Pigment Blue 15:3 | Potassium butyl malonate | 1 part |
| 5 | Pigment Blue 15:3 | Potassium methyl malonate | 1 part |
| 6 | Pigment Blue 15:3 | Sodium butyl malonate | 1 part |
| 7 | Pigment Blue 15:3 | Cesium butyl malonate | 1 part |
| 8 | Pigment Blue 15:3 | Potassium butyl malonate | 0.5 part |
| Comparative Example: | | | |
| 1 | Carbon black | None | 0 part |
| 2 | Pigment Yellow 93 | None | 0 part |
| 3 | Pigment Red 122 | None | 0 part |
| 4 | Pigment Blue 15:3 | None | 0 part |
| 5 | Pigment Blue 15:3 | Potassium malonate | 1 part |
| 6 | Pigment Blue 15:3 | Ammonium butyl malonate | 1 part |

Evaluation

On the inks of Examples 1 to 8 and Comparative Examples 1 to 6 above, their ejection speed and ejection durability were evaluated.

Ejection Speed

In measuring the ejection speed, an ink-jet recording apparatus was used which had an on-demand type multiple recording head (BC-02, manufactured by CANON INC.) ejecting inks by providing the inks with thermal energy in accordance with recording signals. Driving conditions were set to be a drive pulse width of 4.4 μs, a drive voltage of 24.6 V and a drive frequency of 300 Hz. Each ink was set in the apparatus to measure the ejection speed of each ink. Results obtained were evaluated according to the following criteria, and were as shown in Table 2.

Evaluation Criteria

A: Ejection speed of ink droplets is from 10 m/s or more to 12 m/s or less.
B: Ejection speed of ink droplets is from 8 m/s or more to less than 10 m/s.
C: Ejection speed of ink droplets is from 6 m/s or more to less than 8 m/s.
D: Ejection speed of ink droplets is less than 6 m/s.

Ejection Durability

Ejection durability was tested also using the same ink-jet recording apparatus as that used in measuring the ejection speed. Driving conditions were set to be a drive pulse width of 4.4 μs, a drive voltage of 24.6 V and a drive frequency of 6,250 Hz. Each ink was continuously ejected under the above conditions to test ejection durability in the following way. Ink droplets corresponding to $1 \times 10^6$ shots which were ejected from the recording head were collected in a container, and this container was weighed with an electronic balance. Stated specifically, the weight of the container before and after the ejection of the ink droplets corresponding to $1 \times 10^6$ shots was weighed to find a gain in weight of the container after the ejection, where an average ejected droplet quantity in the $1 \times 10^6$ shots (i.e., ink quantity for one shot) was calculated. Then, the ink was continuously ejected up to $1 \times 10^8$ shots, and an average ejected droplet quantity found from the droplet quantity corresponding to final $1 \times 10^6$ shots in the durability test was compared with an average ejected droplet quantity found from the droplet quantity corresponding to first $1 \times 10^6$ shots in the durability test, to make evaluation according to the following criteria. Results obtained are shown in Table 2.

Evaluation Criteria:

A: Average ejected droplet quantity during $9.9 \times 10^7$ to $1 \times 10^8$ shots is 90% or more as compared with the average ejected droplet quantity after 0 to $1 \times 10^6$ shots.
B: Average ejected droplet quantity during $9.9 \times 10^7$ to $1 \times 10^8$ shots is from less than 90% to 70% or more as compared with the average ejected droplet quantity after 0 to $1 \times 10^6$ shots.
C: Average ejected droplet quantity during $9.9 \times 10^7$ to $1 \times 10^8$ shots is less than 70% as compared with the average ejected droplet quantity after 0 to $1 \times 10^6$ shots.
D: The recording head has run into ejection disability on the way of the test.

TABLE 2

Evaluation Results

| | Ejection speed | Ejection durability |
|---|---|---|
| Example: | | |
| 1 | A | A |
| 2 | A | A |
| 3 | A | A |
| 4 | A | A |
| 5 | B | A |
| 6 | B | A |
| 7 | A | A |
| 8 | A | A |
| Comparative Example: | | |
| 1 | D | D |
| 2 | D | D |
| 3 | D | D |
| 4 | D | D |
| 5 | C | C |
| 6 | C | C |

From the above evaluation results, it was ascertained that the incorporation of the alkali metal salt of a malonic acid derivative, represented by the above Formula (1), in the ink making use of the pigment as the coloring material gave inks showing a stable and good ejection performance also in long-time recording. It was also ascertained that better effects were obtained when the R in the above Formula (1) that represents the alkali metal salt of a malonic acid derivative was a butyl group than when it was a methyl group. It was further ascertained that, as the alkali metal salt, cases of potassium salts and a cesium salt were preferred to a case of a sodium salt. It was still further ascertained that, among those represented by the above Formula (1), the use of the potassium salt of a malonic acid derivative is particularly effective taking account of being readily available.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-339577, filed Dec. 18, 2006, which is hereby incorporated by reference in its entirety.

What is claimed is:

1. An ink used in an ink-jet recording process in which ink droplets are ejected from a recording head by the action of thermal energy to record images on a recording medium, the ink comprising (a) a pigment, (b) a dispersing agent, (c) a liquid medium, and (d) an alkali metal salt of a malonic acid derivative, represented by the following Formula (1):

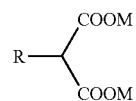

Formula (1)

wherein R represents an alkyl group, and M represents an alkali metal.

2. The ink according to claim 1, wherein M in Formula (1) is potassium.

3. The ink according to claim 1, wherein the component (d) is present in a content of from 0.005% by mass to 5% by mass based on the total mass of the ink.

4. The ink according to claim 1, wherein in Formula (1), R is a methyl group, an ethyl group, a propyl group, a butyl group, a pentyl group, or a hexyl group.

* * * * *